Patented July 1, 1941

2,247,624

UNITED STATES PATENT OFFICE 2,247,624

ALUMINUM HYDRATE

James R. Wall, Collinsville, Ill., assignor to Aluminum Company of America, Pittsburgh, Pa., a corporation of Pennsylvania No Drawing. Application May 31, 1939, Serial No. 276,556

13 Claims. (Cl. 23—143)

This invention relates to the production of crystalline aluminum hydrate in finely divided form, and it more particularly relates to the production of finely divided crystalline aluminum trihydrate by precipitation from solution.

Aluminum trihydrate as usually precipitated from alkaline aluminous solutions (for instance, as in the Bayer process) is distinctly granular in character, and individual grains of the product produced by these processes appear, under microscopic examination, as firm, solid aggregates of small, crystalline particles apparently held together by cementing material. It is typical of the processes used prior to the present invention that when operated to produce aluminum trihydrate in relatively finely divided form, the fine product is slimy and virtually impossible to separate by filtering operations from the liquor from which it is precipitated. The aluminum trihydrate produced by the method of my invention is composed of very finely divided particles which are much finer and more uniform in size than the aluminum trihydrate produced by the Bayer process or any of its known modifications, but is nevertheless readily filterable.

It is an object of the present invention to provide a new and improved form of aluminum trihydrate characterized by its extreme fineness and uniform particle size, which may be utilized in inks, paints, paper, and the like, and particularly as a reinforcing pigment in rubber compounding. A further object of the invention is to provide a practical method of producing uniform finely divided aluminum trihydrate having a particle size of 1 micron or less.

The present invention is predicated upon the discovery that by treating an already prepared alkaline aluminous solution by the steps hereinafter set forth, there can be produced an aluminum trihydrate that filters readily, contains no coarse particles or agglomerates, and which is characterized by a particle size of 1 micron or less.

The process of the present invention consists generally in treating an alkaline aluminous solution, prepared by any suitable process, with an acidic material at low temperature to effect a rapid, partial neutralization, thereby effecting a precipitation of a portion of the alumina content of the solution. The precipitate is then aged at a low temperature with agitation in the solution from which it was precipitated, for a relatively long period to effect some further precipitation and a partial conversion of the precipitated alumina content to a more stable crystalline form of alumina, and then the conversion is completed by digestion at a somewhat higher temperature.

In the practice of the invention, for purposes of economy, it is preferable to use the alkaline aluminous solution separated from the red mud in the well known Bayer process, in which process bauxite is dissolved by heating with a solution of sodium hydroxide, and the soluble sodium aluminate separated from the insoluble residue, red mud, by filtration.

A typical sodium aluminate solution in the Bayer process may contain about 110 grams per liter of sodium hydroxide, about 60 grams per liter of sodium carbonate, and about 88 grams per liter of alumina. However, for the purpose of this invention, sodium aluminate solutions containing alumina in an amount varying from about 65 grams per liter to 150 grams per liter have been successfully used. The corresponding caustic alkalinity required to maintain this alumina in solution, calculated as sodium hydroxide, ranges from about 58 grams per liter to 134 grams per liter.

The partial neutralization of this liquor may be effected by a number of suitable substances, such as sulphuric acid or hydrochloric acid; acid salts, such as sodium bicarbonate; or gases, such as sulphur dioxide or carbon dioxide. Carbon dioxide, because of its low cost and ease of handling, is preferable as a neutralizing agent. Whether carbon dioxide gas or any of the other suitable neutralizing agents is used, I have found that it is necessary that the temperature of the aluminous solution must be kept below about 40° C. during the partial neutralization step, in order to obtain a finely divided alumina precipitate. It is also essential that the partial neutralization step be effected at a rapid rate. The carbon dioxide gas, or other acid gas, if used, must be rapidly bubbled through the aluminous solution; when liquid or solid acids or acid salts are used, they are added rapidly. When using carbon dioxide gas as the neutralizing material, carbonation of the solution should be conducted at such a rate that at least 20 grams per liter of sodium hydroxide is converted to sodium carbonate per hour. The preferred temperature during the partial neutralization step should be below 30° C., as it has been found that the lower the temperature during the partial neutralization step and the subsequent aging step, the finer and more uniform will be the alumina precipitate formed. Artificial cooling may be used if required to maintain this low temperature.

While not essential to the successful practice of the invention, it has been found that if a suitable protective agent is added to the solution being treated, prior to the partial neutralization step, the precipitate formed will be somewhat finer and the process is more easily controlled with respect to the uniformity of the final product. Suitable protective agents are, for example, dextrin and tannic acid or tannic acid concentrates. Generally speaking, I have found that technically pure tannic acid is the best substance for effecting control of the uniformity and size of the precipitate. The amount of the particular protective agent added to the solution is dependent principally upon the agent selected. For example, if using dextrin, about 0.10 to 1 gram per liter may be added to the solution of sodium aluminate. The preferred amount of dextrin appears to be about 0.25 gram per liter of sodium aluminate. When using tannic acid or tannic acid concentrates, it appears that it is necessary to use at least 0.25 gram per liter of tannic acid or its equivalent, in order to have an appreciable effect on the size and uniformity of the precipitate formed, and amounts of tannic acid above about 0.50 gram per liter have been successfully used.

It is essential that the alkaline aluminous solution treated be only partially neutralized. If carried to complete neutralization, the beneficial effects of the subsequent aging and digesting steps will not be obtained and the final product will not have the required small particle size or freedom from agglomerates. When using aluminous solutions having a caustic alkalinity equal to a sodium hydroxide content of about 58 grams per liter to 134 grams per liter, it is preferred to discontinue neutralization when the caustic alkalinity has been decreased to an equivalent of about 50 grams per liter of sodium hydroxide. It has been found that neutralization may be continued until an equivalent of only about 25 grams per liter of sodium hydroxide is reached, but in general it is preferred to maintain an alkalinity equal to about 50 grams per liter of sodium hydroxide in the solution. It is also preferred that the subsequent aging and digestion steps be conducted in the partially neutralized solution in which the precipitate is formed.

It is believed that during the partial neutralization step above described, the precipitate formed is largely finely divided aluminum trihydrate of the so-called beta form. The subsequent aging step effects a partial conversion of the beta aluminum trihydrate to the more stable alpha form. During the aging operation, the temperature of the slurry containing the precipitate should be maintained below about 40° C., and preferably below 30° C. While the aging operation can be conducted with the slurry in a quiescent condition, it is preferable to agitate it during the aging step. The aging operation should be conducted for a period of at least 9 hours, and preferably the aging period should continue from 15 to 70 hours. While satisfactory results have been obtained with longer aging periods, these have been found unnecessary.

After aging, the slurry is digested at an elevated temperature, preferably with agitation. In general, it is preferable to digest at as low a temperature as can be conveniently used and still insure a complete conversion of the beta aluminum trihydrate to the alpha form. In general, to insure complete conversion from the beta to the alpha trihydrate, it is necessary to digest at 60° C. or above. Digestion for a short time at temperatures up to 150° C. has been used with satisfactory results; however, if the digestion time at the higher temperature ranges is unduly prolonged, the aluminum trihydrate initially formed may lose some of its water of hydration and in part, at least, be converted to the monohydrate. In general, the higher the digestion temperature used, the shorter the digestion time; for example, in utilizing digestion temperatures ranging from 60° C. to 150° C., a suitable digestion period would range from about 2 to 16 hours, or longer. Digestion at temperatures from 80° C. to 100° C. for periods of from 3 to 6 hours has been found to give a satisfactorily rapid conversion of the trihydrate from the beta to the alpha form and at the same time produce a product of optimum small particle size and uniformity. The heating for the digestion step may conveniently be conducted by introducing live steam into the vessel containing the slurry.

The conversion of the aluminum trihydrate from the beta to the alpha form can be observed during the digestion period of drawing off samples and subjecting them to microscopic examination. The finer grains of alpha trihydrate can be readily distinguished from the relatively coarse grains of beta trihydrate. After the conversion is found to be complete, the slurry may be pumped to a filter press. The material filters readily when produced by the above described process, and when the filter cake is washed with water, blown with air, and finally dried, for example, in a tray drier, it may be readily disintegrated in, for example, a revolving cage-type disintegrator.

The following specific examples will illustrate the method of my invention.

750 gallons of heated aluminous solution containing approximately 88 grams per liter of $Al_2O_3$, 110 grams per liter of NaOH, and 65 grams per liter of $Na_2CO_3$ were placed in a cylindrical tank. The tank was provided with coils, through which a cooling medium, such as water, could be circulated, and also a steam coil for the purpose of heating the contents of the tank. Suitable agitating mechanism was also provided. The liquid was cooled to about 25° C., and while being maintained at this temperature, carbon dioxide was bubbled through it at a rapid rate until the alkalinity was lowered to a sodium hydroxide equivalent of about 50 grams per liter. The neutralization was then stopped and the slurry agitated for about 40 hours, while maintaining a temperature of about 25° C. The slurry was then heated in the same vessel to a temperature of about 60° C. for a period of about 16 hours. The slurry was filtered and the trihydrate washed with water. It was then blown with air, dried, and put through a cage-type disintegrator to separate the particles. The resulting product was found to have a uniform particle size of 1 micron or less.

A volume of 2460 gallons containing 84.9 grams per liter of $Al_2O_3$, 105.7 grams per liter of NaOH, and 51.8 grams per liter of $Na_2CO_3$ was run into a vessel provided with agitating and cooling means. To the solution while at a temperature of about 93° C. there was added 2.27 kg. of dextrin. While being agitated, the solution was cooled to a temperature of about 18° C. 2000 gallons of this solution was then placed in another tank equipped with cooling means, agitating means, means for admitting gas to the solution, and means for admitting steam to the solution. Lime kiln gas containing approximately 20 per cent $CO_2$ was blown into the solution for a period of 2½ hours. By the circulation of coolant, the temperature of the solution was held below about 24° C. during the gassing operation. The gassing operation resulted in a precipitation of a portion of the alumina content. After gassing, the slurry was aged for a period of 20 hours at a temperature of about 21° C., and a sample of it filtered. The filtrate was found to contain approximately 17.4 grams per liter of $Al_2O_3$, approximately 49.8 grams per liter of NaOH, and approximately 129 grams per liter of $Na_2CO_3$. The temperature of the slurry was then raised by means of live steam to about 93° C. and it was agitated at this temperature for a period of about 4 hours. After filtering and washing with water, the filter cake was dried in a tray drier at about 105° C. The dried product was readily disintegrated, and when subjected to microscopic examination it was found that all particles had a diameter of less than 0.8 micron, and an average particle size of 0.4 micron. The material had an apparent bulk density of about 27 pounds per cubic foot.

A volume of 2460 gallons of alkaline aluminous solution prepared by the Bayer process was run into a tank equipped with a cooling coil and a circulating pump at a temperature of about 57° C. Analysis of the liquor showed it to contain 83.1 grams per liter of $Al_2O_3$, 105 grams per liter of NaOH, and 61.3 grams per liter of $Na_2CO_3$. 10 pounds of a tannin concentrate containing 45 to 48 per cent tannic acid was added and the liquor cooled to approximately 21° C. during a period of about 3 hours. 2000 gallons of the cooled liquor was then pumped into a second tank. This tank was equipped with a cooling coil, a circulating pump, an arrangement for admitting carbon dioxide gas to the liquor, and a connection for admitting steam to the liquor. Lime kiln gas containing 18 to 20 per cent $CO_2$ was bubbled through the liquor for a period of 2½ hours, while cooling water was circulated through the cooling coils to dissipate the heat of reaction and hold the temperature below about 27° C. After gassing, the slurry was agitated by means of the circulating pump for a period of 9 hours at a temperature of about 21° C. The slurry was then heated by means of live steam to about 93° C. and agitated for 4 hours at this temperature. The sample of filtered liquor at this point showed an alkalinity equal to a sodium hydroxide content of 54 grams per liter. The slurry was pumped to a filter press, and after filtration and washing with water, the filter cake was dried in a tray drier. After disintegration of the filter cake, the material was found to have an average particle size of 0.4 micron and contained no material of a size greater than 1 micron.

While the invention has been described in connection with the production of fine aluminum trihydrate of the so-called alpha form, it is apparent that by modification the method herein described may be adapted to produce finely divided aluminum hydrates of other crystalline forms and having amounts of combined $H_2O$ varying from that of aluminum trihydrate.

I claim:

1. A method of producing fine aluminum hydrate from an alkaline aluminous solution, which consists in partially neutralizing said solution at a rapid rate while maintaining the temperature below about 40° C. to effect a precipitation of aluminum hydrate, aging the precipitated aluminum hydrate in an alkaline solution at a temperature below about 40° C., and subsequently digesting the aluminum hydate at a temperature above about 60° C.

2. A method of producing fine aluminum hydrate from an alkaline aluminous solution, which consists in partially neutralizing said solution while maintaining the temperature below about 40° C. to effect a rapid precipitation of aluminum hydrate, aging the precipitated aluminum hydrate in the alkaline aluminous solution at a temperature below about 40° C. for a period of from 9 to 70 hours, and subsequently digesting the aluminum hydrate in said solution at a temperature between about 60° C. to 150° C.

3. A method of producing fine aluminum hydrate from a sodium aluminate solution, which consists in partially neutralizing said solution while maintaining the temperature below about 40° C. to effect a rapid precipitation of aluminum hydrate, aging the precipitated aluminum hydrate in the sodium aluminate solution at a temperature below about 40° C. for a period of from 9 to 70 hours, and subsequently digesting the aluminum hydrate in said solution at a temperature between about 60° C. to 150° C.

4. A method of producing fine aluminum trihydrate from an alkaline aluminate solution, which consists in partially neutralizing said solution while maintaining the temperature below about 40° C. to effect a rapid precipitation of aluminum trihydrate, aging the precipitated aluminum trihydrate in the alkaline solution from which it was precipitated at a temperature below about 40° C. for a period of from 9 to 70 hours, and subsequently digesting the aluminum trihydrate in said solution at a temperature between about 60° C. to 150° C. to effect a substantially complete conversion of the aluminum trihydrate to the alpha form.

5. A method of producing fine aluminum trihydrate from an alkaline aluminate solution, which consists in partially neutralizing said solution while maintaining the temperature below about 30° C. to effect a rapid precipitation of aluminum trihydrate, aging the precipitated aluminum trihydrate in the alkaline solution from which it was precipitated at a temperature below about 30° C. for a period of from 9 to 70 hours, and subsequently digesting the aluminum trihydrate in said solution at a temperature between about 60° C. to 150° C. to effect a substantially complete conversion of the aluminum trihydrate to the alpha form.

6. A method of producing fine aluminum trihydrate from an alkaline aluminate solution, which consists in partially neutralizing said solution while maintaining the temperature below about 40° C. to effect a rapid precipitation of aluminum trihydrate, aging the precipitated aluminum trihydrate in the alkaline solution from which it was precipitated at a temperature below about 40° C. for a period of from 9 to 70 hours, and subsequently digesting the aluminum trihydrate in said solution at a temperature between about 60° C. to 150° C. for a period of from 2 to 16 hours to effect a substantially complete conversion of the aluminum trihydrate to the alpha form.

7. A method of producing fine aluminum trihydrate from a sodium aluminate solution having an alkalinity equivalent to a sodium hydroxide content of from about 58 grams per liter to 134 grams per liter, which consists in reducing the alkalinity of said solution by gassing with carbon dioxide to an equivalent of about 50 grams per liter of sodium hydroxide, at a rate which converts at least 20 grams per liter of sodium hydroxide to sodium carbonate per hour to effect a rapid precipitation of aluminum trihydrate while maintaining the temperature of the solution below about 30° C., aging the precipitated aluminum trihydrate in the alkaline solution from which it was precipitated at a temperature below about 30° C. for a period of from 9 to 70 hours, and subsequently digesting the aluminum trihydrate in said solution at a temperature between about 60° C. to 150° C. for a period of from about 2 to 16 hours to effect a substantially complete conversion of the aluminum trihydrate to the alpha form.

8. A method of producing fine aluminum trihydrate from a sodium aluminate solution having an alkalinity equivalent to a sodium hydroxide content of from about 58 grams per liter to 134 grams per liter, which consists in reducing the alkalinity of said solution by gassing with carbon dioxide to an equivalent of about 25 grams per liter of sodium hydroxide, at a rate which converts at least 20 grams per liter of sodium hydroxide to sodium carbonate per hour to effect a rapid precipitation of aluminum trihydrate while maintaining the temperature of the solution below about 40° C., aging the precipitated aluminum trihydrate in the alkaline solution from which it was precipitated at a temperature below about 40° C. for a period of from 9 to 70 hours, and subsequently digesting the aluminum trihydrate in said solution at a temperature between about 60° C. to 150° C. for a period of from about 2 to 16 hours to effect a substantially complete conversion of the aluminum trihydrate to the alpha form.

9. A method of producing fine aluminum trihydrate from a sodium aluminate solution having an alkalinity equivalent to a sodium hydroxide content of from about 58 grams per liter to 134 grams per liter, which consists in reducing the alkalinity of said solution by gassing with carbon dioxide to an equivalent of about 50 grams per liter of sodium hydroxide, at a rate which converts at least 20 grams per liter of sodium hydroxide to sodium carbonate per hour to effect a rapid precipitation of aluminum trihydrate while maintaining the temperature of the solution below about 30° C., aging the precipitated aluminum trihydrate in the alkaline solution from which it was precipitated at a temperature below about 30° C. for a period of from 9 to 70 hours, and subsequently digesting the aluminum trihydrate in said solution at a temperature between about 80° C. to 100° C. for a period of from about 3 to 6 hours to effect a substantially complete conversion of the aluminum trihydrate to the alpha form.

10. A method of producing fine aluminum trihydrate from a sodium aluminate solution containing a protective agent and having an alkalinity equivalent to a sodium hydroxide content of from about 58 grams per liter to 134 grams per liter, which consists in reducing the alkalinity of said solution by gassing with carbon dioxide to an equivalent of about 50 grams per liter of sodium hydroxide, at a rate which converts at least 20 grams per liter of sodium hydroxide to sodium carbonate per hour to effect a rapid precipitation of aluminum trihydrate while maintaining the temperature of the solution below about 30° C., aging the precipitated aluminum trihydrate in the alkaline solution from which it was precipitated at a temperature below about 30° C. for a period of from 9 to 70 hours, and subsequently digesting the aluminum trihydrate in said solution at a temperature between about 60° C. to 150° C. for a period of from about 2 to 16 hours to effect a substantially complete conversion of the aluminum trihydrate to the alpha form.

11. As an article of manufacture, a material identical with the product produced by the process of claim 1 consisting of precipitated aluminum trihydrate of the alpha crystalline form having, as precipitated, a particle size of less than about 1 micron.

12. As an article of manufacture, a material identical with the product produced by the process of claim 1 consisting of precipitated aluminum trihydrate of the alpha crystalline form having, as precipitated, an average particle size of less than about 0.5 micron.

13. As an article of manufacture, a material identical with the product produced by the process of claim 1 consisting of precipitated aluminum trihydrate of the alpha crystalline form having, as precipitated, an average particle size of less than about 0.5 micron and a maximum particle size of less than about 1 micron.

JAMES R. WALL.